United States Patent [19]

Tenberg et al.

[11] Patent Number: 4,544,140

[45] Date of Patent: Oct. 1, 1985

[54] DEVICE FOR MEASURING THE LEVEL OF THE INTERFACE BETWEEN A SLAG LAYER AND A BATH OF MOLTEN METAL IN A METALLURGICAL VESSEL

[75] Inventors: Werner Tenberg, Ratingen, Fed. Rep. of Germany; Gustav Kolb, Im Ohl 52, 5870 Hemer, Fed. Rep. of Germany

[73] Assignees: Mannesmann AG, Duesseldorf; Gustav Kolb, Hemer, both of Fed. Rep. of Germany

[21] Appl. No.: 462,383

[22] Filed: Jan. 31, 1983

[30] Foreign Application Priority Data

Feb. 12, 1982 [DE] Fed. Rep. of Germany ....... 3205528

[51] Int. Cl.$^4$ ............................................... C21C 5/30
[52] U.S. Cl. ........................................ 266/99; 266/94
[58] Field of Search ...................... 266/94, 95, 99, 88, 266/78, 80; 73/304 R, DIG. 9

[56] References Cited

U.S. PATENT DOCUMENTS

| 3,395,908 | 8/1968 | Woodcock | 266/94 |
| 4,196,624 | 4/1980 | Willenbrock et al. | 73/304 R |

FOREIGN PATENT DOCUMENTS

| 2842136 | 10/1979 | Fed. Rep. of Germany | 266/99 |
| 2937353 | 4/1981 | Fed. Rep. of Germany | 266/99 |
| 2931353 | 12/1981 | Fed. Rep. of Germany | . |
| 1524024 | 9/1978 | United Kingdom | 73/304 R |

Primary Examiner—L. Dewayne Rutledge
Assistant Examiner—S. Kastler
Attorney, Agent, or Firm—Ralf H. Siegemund

[57] ABSTRACT

The device is to include a cylindrical carrier member for insertion into a tubular lance, also having an overhanging flange on the opposite side thereof being disposed a tapered electrode carrier either a cone with rounded apex or a symmetrical wedge with rounded apex and steep rounded sides.

7 Claims, 3 Drawing Figures

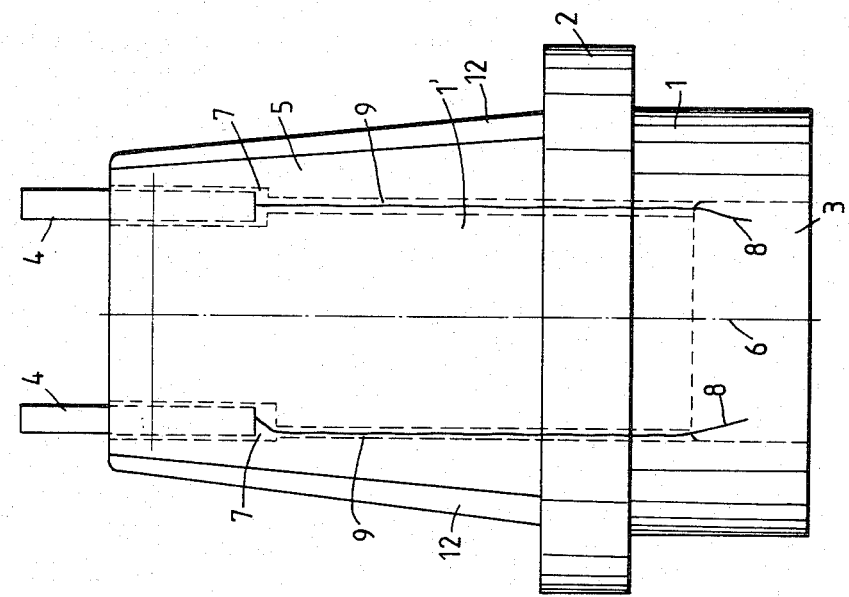
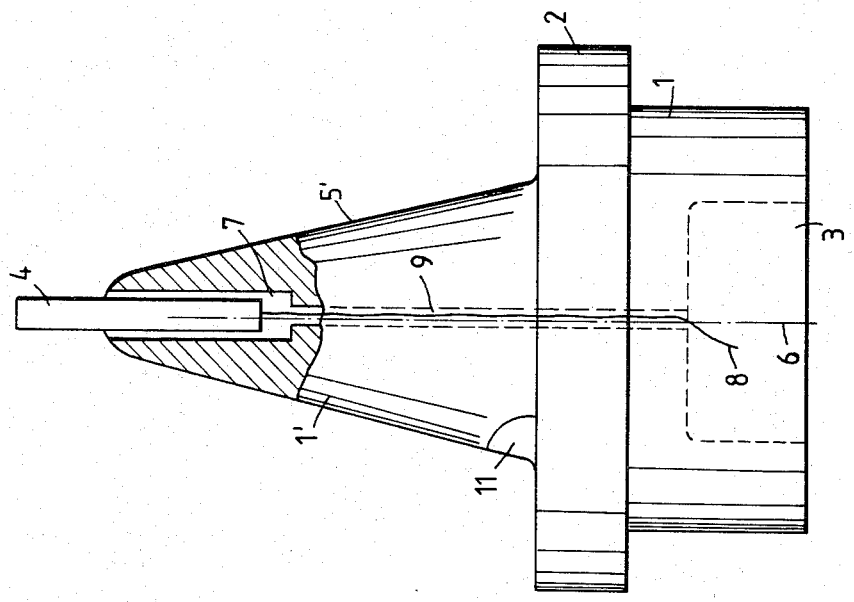

4,544,140

DEVICE FOR MEASURING THE LEVEL OF THE INTERFACE BETWEEN A SLAG LAYER AND A BATH OF MOLTEN METAL IN A METALLURGICAL VESSEL

BACKGROUND OF THE INVENTION

The present invention relates to a device for measuring the level of a metal bath underneath a slag layer and in metallurgical vessel.

German printed patent application No. 29 37 353 describes a device, i.e. probe or sampling device, for measuring the depth of the level of molten metal underneath slag cover. This type of device is deemed advantageous particularly from the point of view of the principle of operation. Therefore, in practice with measuring result was deemed reliable and particularly it has been the common belief that the values ascertained by means of such a device depict accurately the actual conditions in the vessel. It was found, however, that upon measuring the bath level during insertion of the lance holding the probe, errors arose. These errors may quite possibly be attributed to a coating of the electrodes with the slag as the probe traverses the slag layer. This would means that the direct engagement of the electrodes with the steel in the bath is delayed because that coating has to melt off in the bath before the steel can engage the electrodes. This delay occurs upon insertion of the probe and simulates a lower level of the metal bath than is actually present.

In order to avoid the aforementioned problem, it has been tried to cover the electrodes with sheet metal caps which melt on contact with the metal bath and the level is actually ascertained during retraction of the probe. However, comparative measurements indicate that this method is likewise not free from errors whereby particularly the magnitude of the error is dependent upon the speed of lance motion.

DESCRIPTION OF THE INVENTION

It is an object of the present invention to provide a new and improved device for measuring the level of the molten steel bath underneath the slag layer and within a metallurgical vessel.

It is another object of the present invention to improve a device for measuring the level of the interface between a slag layer and a liquid steel bath in a metallurgical vessel using a probe member made of heat resisting material with two projecting electrodes and a structure permitting the connection of this probe to a tubular holder.

In accordance with the preferred embodiment, it is suggested to provide such a probe in accordance with the objects of the invention by using a carrier member preferably of cylindrical configuration, and provide this member with a flange serving as a stop against which a tube into which the carrier member is inserted will abut for positioning the device as a whole in relation to said such a tube serving as a lance. The particular flange has a surface from which extends a tapered member having a rounded top and serving as holder for two electrodes projecting partially from the surface of the electrode holder. The electrode holder may be constructed as a cone with an angle of inclination between 60° and 80° and a rounded top. Alternatively, the electrode holder may be a symmetrical wedge, its wedge defining surfaces also having an angle in relation to the surface of the flange by 60° to 80°. Moreover, the wedge is to have a rounded top and steep rounded small sides. The height of the electrode holder is to be equal to or larger than the diameter of the carrier member which is inserted in the tube lance. Still alternately the electrode holder may be a semisphere.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof, will be better understood from the following description taken in connection with the accompanying drawings in which:

FIG. 2 is a side view of such a probe being, however, particularly modified for purposes of accommodating a larger electrode spacing but still constituting an example of the preferred embodiment; and FIG. 3 is a side view of the device shown in FIG. 2.

Proceeding now to the detailed description of the drawings, FIG. 1 illustrates a cylindrical carrier and mounting member 1 made of heat resisting material such as a suitable ceramic. Cylindrical carrier member 1 is provided with a collar or flange 2 serving as an axial end stop. The body or member 1 has a diameter d which is chosen so that it can be inserted and plugged into a cardboard tube serving as the lance or carrier for the probe. The tube will abut collar or flange 2.

Figure 1:
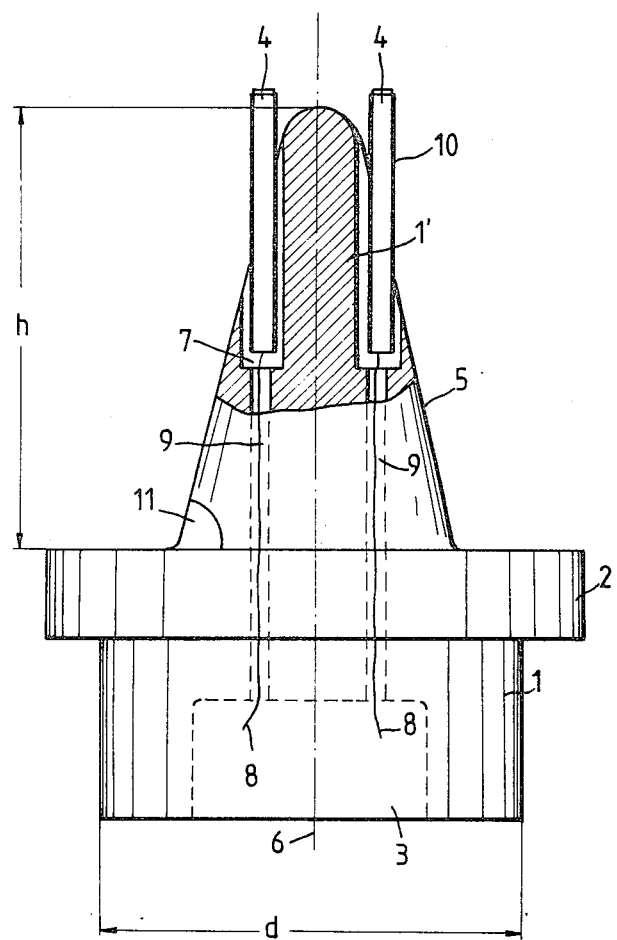
FIG. 1 is a side view partially in section of a probe and measuring device in accordance with the preferred embodiment of the present invention for practicing the best mode thereof.

The member 1 is provided with a suitable opening or recess 3 which is in turn provided for receiving a connecting member by means of which electrical connections that run through the cardboard tube are terminated. This termination is carried on such that the electrical connections can be connected with wires 8.

The collar or flange member 2 carries, preferably integrally, a tapering or conical member 1' having a rounded apex. The height h of this conical extension is measured from the surface of flange 2 opposite body 1 up to the rounded peak of the tapering cone 1'. Therefore, it can be said that the outer surface of this extension 1' is inclined in a direction away from the flange and stop member 2. The angle of inclination 11 is approximately 70°. The height h of part 1' should be approximately be equal to the diameter d. However, at the very least this height h should not be smaller than the diameter d.

The conical extension 1' has a pair of bores 7 which receive the electrodes 4. These electrodes by themselves are jacketed in a ceramic material 10. The electrodes 4 are embedded in the bores by means of a suitable adhesive inside the parallel blind bores 7. They extend in parallel to the longitudinal axis 6 of the device as a whole and here particularly of the cylindrical body 1.

Narrow bores 9 extend from the bottoms of the blind bores 7 to the bottom of the opening 3. The wires 8 traverse these bores 9, and particularly, these wires 8 extend from the bottom of the electrodes 4 into the open space of the recess 3 for purposes of fastening to the connecting element which is received in the recess 3 as was mentioned above. It was found that a construction for a probe of the type illustrated and described is suitable for rendering the measuring result independent from the speed by means of which the probe is moved through the molten metal. In this regard, it is important that the electrodes 4 project slightly beyond the calotta shaped apex portion of the cone.

The cone may actually merge in with the periphery of the flange.

Elements 1, 2 and 3 in FIGS. 2 and 3 are similar to the elements of like designation, or the device shown in FIG. 1. However, the element projecting from the flange or collar 2 in the direction opposite the disposition of the holding lance is constructed as a twin sided and symmetrical wedge with rounded wedge peak. This body is designated by reference numeral 21 and has relatively wide inclined sides 25. The inclinition angle of each of these sides 25 is also about 70°. On the other hand, the narrow sides 22 of this body 21 are steeper than the sides 25, however, they are rounded.

Any of the probes described above has the advantage that it provides measuring results which are independent from the speed of moving the probe through the molten metal, particularly if the speed is within the range from 0.1 meters per second to about 1 meter per second.

The invention is not limited to the embodiments described above; but all changes and modifications thereof, not constituting departures from the spirit and scope of the invention, are intended to be included.

We claim:

1. A device for measuring the depth of the level of molten metal within a metallurgical vessel and underneath a slag layer including a carrier member for insertion into an elongated carrier tube; and an annular flange member on the carrier member and serving as a stop for the carrier tube and having an oppositely oriented surface; the improvement comprising:
   an electrode holder on said surface extending therefrom and being of tapering configuration and wherein the tapering surface is at least partially rounded, said tapering member having a height which is not smaller than the diameter of said carrier member; and
   a pair of electrodes inserted in bores in said electrode holder and anchored therein, there being electrical connections running from the electrodes into said carrier.

2. A device as in claim 1, said electrode holder being a cone.

3. A device as in claim 2, said cone having a rounded apex.

4. A device as in claim 1 wherein said electrode holder is a cone merging into the periphery of said stop.

5. A device as in claim 1, said electrode holder being of wedge shaped, symmetrical configuration with rounded steep, small sides and rounded apex.

6. Device as in claim 1 wherein said tapered electrode holder has an angle in relation to the surface of the flange between 60° and 80°.

7. Device as in claim 1 wherein said electrode holder is of rounded configuration.

* * * * *